United States Patent
Farreyrol

(10) Patent No.: US 12,144,071 B2
(45) Date of Patent: *Nov. 12, 2024

(54) VEHICLE WINDOW GLASS WITH ELECTRICAL CONNECTOR SOLDERED BY LEAD-FREE SOLDER

(71) Applicant: ACR II GLASS AMERICA INC., Nashville, TN (US)

(72) Inventor: Olivier Farreyrol, Grevenmacher (LU)

(73) Assignee: ACR II GLASS AMERICA INC., Nashville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/136,510

(22) Filed: Apr. 19, 2023

(65) Prior Publication Data

US 2023/0254947 A1    Aug. 10, 2023

Related U.S. Application Data

(63) Continuation of application No. 15/926,502, filed on Mar. 20, 2018, now Pat. No. 11,659,631.

(30) Foreign Application Priority Data

Mar. 22, 2017  (GB) ..................................... 1704525

(51) Int. Cl.
*H05B 3/86*     (2006.01)
*C03C 27/04*    (2006.01)
(Continued)

(52) U.S. Cl.
CPC ............. *H05B 3/86* (2013.01); *C03C 27/046* (2013.01); *C22C 38/08* (2013.01); *C22C 38/105* (2013.01);
(Continued)

(58) Field of Classification Search
CPC ... H05B 3/86; H05B 3/06; H05B 3/84; H05B 2203/016; C03C 27/08; C03C 27/046;
(Continued)

(56) References Cited

U.S. PATENT DOCUMENTS

| | | | |
|---|---|---|---|
| 3,634,654 A | 1/1972 | Peetz et al. | |
| 11,659,631 B2 * | 5/2023 | Farreyrol | ................ C22C 38/08 156/99 |

(Continued)

FOREIGN PATENT DOCUMENTS

| | | |
|---|---|---|
| CA | 2884777 A1 | 3/2014 |
| CA | 2969026 A1 | 6/2016 |

(Continued)

OTHER PUBLICATIONS

"Communication of a Notice of Oppositions for EP Application No. 18163070.8", submitted by AGC Glass Europe on Jul. 27, 2021, issued by European Patent Office on Aug. 2, 2021.

(Continued)

*Primary Examiner* — Nathaniel E Wiehe
*Assistant Examiner* — Alba T Rosario-Aponte
(74) *Attorney, Agent, or Firm* — K&L Gates, LLP; Shu Chen

(57) ABSTRACT

A vehicle window glass comprises a glass substrate layer, an electrically conductive layer forming a conductive pattern over the glass substrate, a lead-free solder layer on the conductive layer and a metal plate element of an electrical connector on the solder layer. Optionally a coloured ceramic band layer is sintered between the glass substrate layer and the conductive layer. The thickness of the metal plate element is between 0.5 mm and 0.7 mm.

21 Claims, 2 Drawing Sheets

(51) Int. Cl.
   *C22C 38/08* (2006.01)
   *C22C 38/10* (2006.01)
   *H01R 4/02* (2006.01)
   *H01R 43/02* (2006.01)
   *H05B 3/06* (2006.01)
   *H05B 3/84* (2006.01)

(52) U.S. Cl.
   CPC .......... *H01R 4/02* (2013.01); *H05B 3/06* (2013.01); *H05B 3/84* (2013.01); *H01R 43/0214* (2013.01); *H01R 2201/26* (2013.01); *H05B 2203/016* (2013.01)

(58) Field of Classification Search
   CPC ......... C22C 38/105; C22C 38/08; H01R 4/02; H01R 43/0214; H01R 2201/26
   USPC .............................................. 219/203; 156/99
   See application file for complete search history.

(56) References Cited

U.S. PATENT DOCUMENTS

| | | | |
|---|---|---|---|
| 2003/0227663 A1* | 12/2003 | Agrawal | G02F 1/157 359/265 |
| 2007/0224842 A1 | 9/2007 | Hoepfner et al. | |
| 2009/0233119 A1* | 9/2009 | Lyon | H01R 4/02 428/631 |
| 2012/0298416 A1 | 11/2012 | Ziegler et al. | |
| 2015/0264800 A1 | 9/2015 | Schmalbuch et al. | |
| 2015/0296569 A1* | 10/2015 | Rateiczak | H05B 3/84 219/541 |
| 2015/0296615 A1* | 10/2015 | Schmalbuch | H05K 1/09 174/257 |
| 2018/0083339 A1* | 3/2018 | Werner | H01Q 1/02 |
| 2018/0330845 A1* | 11/2018 | Reul | H01R 4/029 |

FOREIGN PATENT DOCUMENTS

| | | |
|---|---|---|
| CA | 2984056 A1 | 11/2016 |
| CA | 2884777 C | 2/2018 |
| CA | 2984056 C | 3/2020 |
| DE | 102006017675 A1 | 10/2007 |
| DE | 106463845 A | 2/2017 |
| DE | 202016008092 U1 | 3/2017 |
| EP | 2683033 A1 | 1/2014 |
| GB | 1163224 A | 9/1969 |
| JP | 2009530783 A | 8/2009 |
| JP | 2014514724 A | 6/2014 |
| JP | WO2012118202 A1 | 7/2014 |
| JP | 2016503568 A | 2/2016 |
| JP | 2017010737 A | 1/2017 |
| WO | 2004068643 A1 | 8/2004 |
| WO | 2007110610 A1 | 10/2007 |
| WO | 2007110612 A1 | 10/2007 |
| WO | 2007116088 A1 | 10/2007 |
| WO | 2011107341 A1 | 9/2011 |
| WO | 2011107342 A1 | 9/2011 |
| WO | 2012152543 A1 | 11/2012 |
| WO | 2014040773 A1 | 3/2014 |
| WO | 2014040774 A1 | 3/2014 |
| WO | 2014079595 A1 | 5/2014 |
| WO | 2016096248 A1 | 6/2016 |

OTHER PUBLICATIONS

"Communication of a Notice of Oppositions for EP Application No. 18163070.8", submitted by Saint-Gobain Glass France on Jul. 28, 2021, issued by European Patent Office on Aug. 2, 2021.

Decision in Opposition Proceedings from corresponding European Patent No. 3379899, dated Oct. 26, 2022.

Extended European Search Report from corresponding European Patent Application No. 18163070.8 dated Aug. 18, 2018.

Heanjia Super-Metals Co., Ltd. "Nilo 48 Invar 48 (UNS K94800).".

International Organization for Standardization. "ISO 16293-1 Glass in Building—Basic Soda Lime Silicate Glass Products", Jul. 1, 2008.

Notice of Reasons for Refusal from corresponding Japanese Patent Application No. 2018-039468 dated Sep. 15, 2021, with English Translation.

Search Report from corresponding Great Britain Application No. GB1704525.3 dated Jun. 29, 2017.

Translation of Chinese Office Action from corresponding Chinese Application No. 201810238987.9 mailed Jul. 29, 2022.

Wikipedia. "Kalk-Natron-Glas." <https://de.wikipedia.org/w/index.php?title=Kalk-Natron-Glass&oldid=222864819> Retrieved May 14, 2022.

Wilson Ltd. "EN 10088-2." Stainless Steel—EN Standards for Stainless Steel C.R. Sheet, Revised Jul. 18, 2019, pp. 1-3.

* cited by examiner

VEHICLE WINDOW GLASS WITH ELECTRICAL CONNECTOR SOLDERED BY LEAD-FREE SOLDER

CROSS-REFERENCE TO RELATED APPLICATIONS

This application is a continuation of U.S. patent application Ser. No. 15/926,502, filed Mar. 20, 2018, which claims foreign priority benefits under 35 U.S.C. § 119 to Great Britain Patent Application No. GB 1704525.3, filed Mar. 22, 2017, the entire content of which is incorporated herein by reference.

TECHNICAL FIELD

The invention relates to a vehicle window glass comprising an electrically conductive layer over the window glass, and an electrical connector soldered by a lead-free solder on the conductive layer.

BACKGROUND OF THE INVENTION

In a vehicle window glass comprising an electrically conductive layer over the window glass and an electrical connectors soldered by a solder on the conductive layer, lead-containing solders have been used. However, the End of Life Vehicles Directive 2000/53/EC urges the use of lead-free solders instead of the lead-containing solders.

The use of lead-free solders has led to a difficulty in compensating mechanical stresses between the window glass and the electrical connectors, resulting in the occurrence of cracks in the window glass.

In order to solve this problem, U.S. Pat. No. 8,816,214 discloses a window glass comprising a glass substrate and an electrical connector made of a metal having thermal expansion coefficient near to that of the glass substrate.

WO2007/110610 suggests that a thinner electrical connector, preferably an electrical connector having 0.1 mm to 0.5 mm thickness, can reduce the mechanical stress.

US2016/0296569 proposes a discrete compensator plate between the connector and the conductive layer.

SUMMARY OF THE INVENTION

The window glass disclosed in U.S. Pat. No. 8,816,214 is found to be still insufficient from the point of view of crack occurrences in the glass substrate. Thus, further improvement is required. Although WO2007/110610 suggests that an electrical connector having 0.1 mm to 0.5 mm thickness can reduce the mechanical stress, we found that such very thin electrical connectors are liable to the formation of hot spots in the connector during the soldering process using electric resistance heating of the connector. The generation of hot spots may result in residual stresses in the glass substrate, which cause cracks in the glass substrate.

It is an aim herein to provide new vehicle window glass comprising an electrically conductive layer over the window glass, and an electrical connector soldered by a lead-free solder on the conductive layer, especially taking account off the drawbacks mentioned above.

According to one aspect of the present invention, there is provided a vehicle window glass, comprising:
a glass substrate layer;
an electrically conductive layer forming a conductive pattern over the glass substrate;
a solder layer on the conductive layer; and
a metal plate element;
wherein a thickness of the metal plate element is between 0.5 mm and 0.7 mm.

Other aspects and preferred aspects are set out in the claims and discussed below.

A colored ceramic band layer may be provided between the glass substrate layer and the conductive layer. This is usually a sintered layer.

The thickness of the solder layer may be between 0.1 mm and 0.3 mm. The solder layer may be made of a tin-based metal alloy comprising silver.

The metal plate element may be, or may be comprised in, an electrical connector for connecting the electrically conductive layer to external electric wiring. Such electrical connector may comprise first and second said metal plate elements connected by a bridge portion, preferably formed integrally from a single piece of metal plate material.

The thickness of the metal plate element is preferably at least 0.52 mm, more preferably at least 0.54 mm. The thickness is preferably not more than 0.65 mm, more preferably not more than 0.6 mm.

The metal plate element preferably comprises or consists of iron alloy such as Invar 48.

Preferably the surface of the metal plate element facing the solder layer is flat. The metal plate element may be coated with one or more metals selected from Ni, Cu and Ag, e.g., Ni, Cu and Ag layers in that order from the element.

Another aspect is a method of making such a window glass, comprising
preparing the glass substrate having the electrically conductive layer on the glass substrate, and optionally with said coloured ceramic band layer between the glass substrate and the conductive layer;
preparing an electrical connector comprising said at least one metal plate element with a surface to be soldered;
placing lead-free solder on the conductive layer, and
heating the electrical connector, such as by electric resistance heating, to melt the lead-free solder between the conductive layer and said surface of the metal plate element.

Advantageous Effect of the Invention

We find that by using a window glass having the above structure, the mechanical stress between the window glass and an electrical connector including the metal plate element can be relaxed, and crack occurrence is decreased.

DETAILED DESCRIPTION

Figure 1:
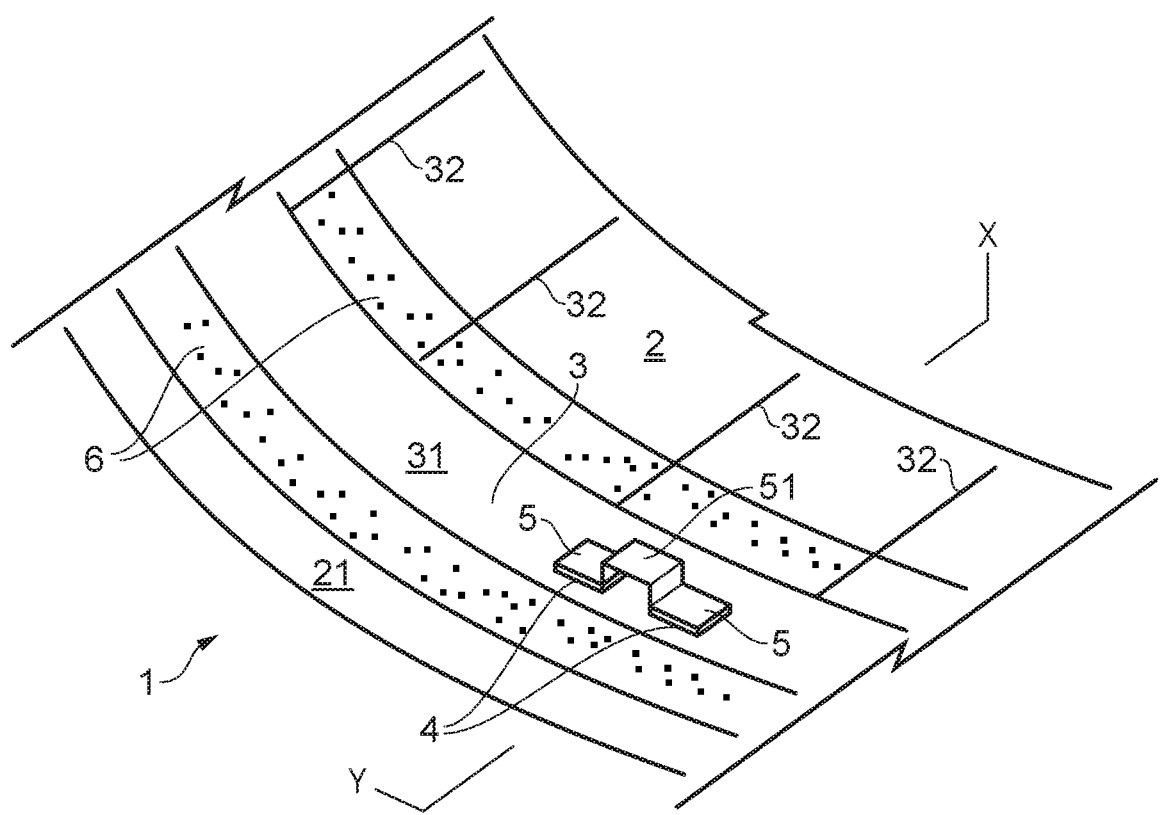
FIG. 1 is a schematic view showing main components for the present invention.

In the following description, for purposes of explanation and not limitation, specific details are set forth in order to provide an understanding of certain embodiments of the present invention. However, it will be apparent to those skilled in the art that the present invention may be practised in other embodiments that depart from these specific details. In other instances, detailed descriptions of well-known devices, processes, techniques, and methods are omitted so as not to obscure the description with unnecessary detail.

We refer now more particularly to the accompanying drawings, in which like reference numerals indicate like parts/elements throughout the several views.

Figure 2:
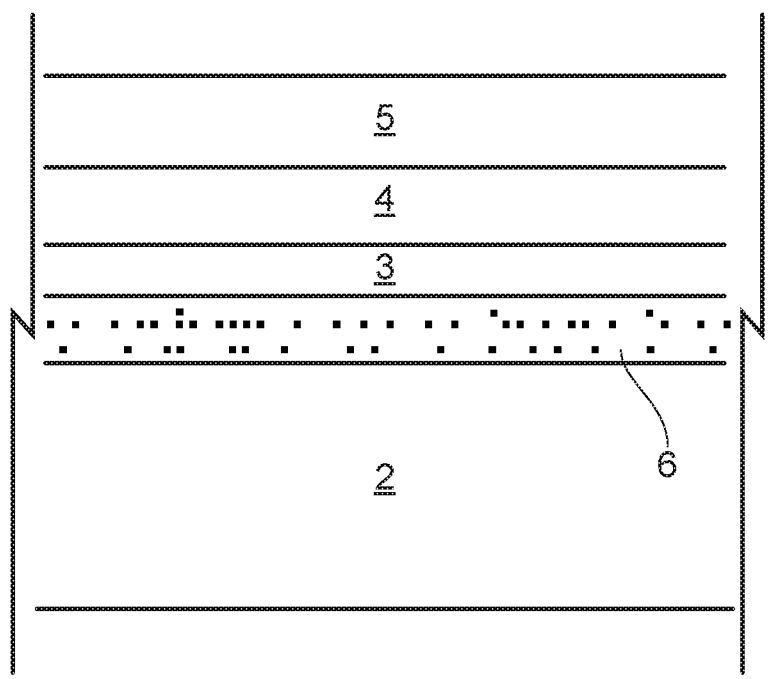
FIG. 2 is a cross-sectional view at X-Y of FIG. 1.

For better understanding of the present invention, the present invention is described using figures. FIG. 1 shows a schematic view of the main parts of a vehicle window glass embodying the present invention. FIG. 2 shows the X-Y cross-section of FIG. 1. In accordance with typical embodiments of the present invention, a vehicle window glass 1 comprises a glass substrate layer 2 having an edge portion 21, an optional coloured ceramic band layer 6 sintered on a peripheral portion of the glass substrate layer 2, an electrically conductive layer 3, sintered on the glass substrate layer 2 and/or on the coloured ceramic band layer 6 and having a pair of busbars 31 and plural conductive wires 32 connected to the busbars 31, a lead-free solder layer 4 on the conductive layer 3 (preferably on a busbar 31 thereof), and a metal plate element 5 on the solder layer 4, to be connected to electric wiring either directly or via a metal bridge portion 51 connecting two such metal plate elements 5. The metal plate element constitutes or is comprised in an electrical connector. The connector may be made or formed from metal plate material, especially in a single piece. The connector may comprise one or at least one metal plate element 5, or may comprise two metal plate elements 5 and a metal bridge 51 connecting the two metal plate elements 5. A metal plate element 5 lies against the solder layer 4.

The glass substrate layer 2 preferably has a curved shape, obtainable e.g. by a known bending process of a flat glass sheet. The glass substrate layer 2 may be a thermally tempered glass, a chemically tempered glass or a laminated glass. As a material of the glass substrate layer 2, a soda-lime silicate glass defined by ISO16293-1 can be used. The soda-lime silicate glass may comprise a colorant such as iron oxide and cobalt oxide, whereby to present a color such as pale green, dark green, pale gray, dark gray, pale blue or dark blue.

The coloured ceramic band layer 6 is of a color ceramic composition preferably comprising an inorganic heat-resisting pigment and a glass frit that has lower softening temperature than that of the glass substrate layer 2. Such a peripheral band layer is well-known, and sometimes called a frit layer, ceramic band or paint band. The coloured ceramic band layer 6 is used to overlie an adhesion area between the vehicle window glass 1 and a body flange of a vehicle. It can improve weather resistance of the adhesion area and/or make it invisible by covering it, so that black color is preferable as the hue of the coloured ceramic band layer 6. The thickness of the coloured ceramic band may be e.g. 5 μm to 25 μm, preferably 5 μm to 15 μm.

The coloured ceramic band layer 6 can be obtained through the following process, for example. That is, a ceramic paste comprising the inorganic heat-resisting pigment, a glass frit and organic solvent is applied on the peripheral portion of the glass substrate layer 2 by a screen printing method or the like, and then heated, volatilizing the organic solvent. Subsequently, the composition comprising the inorganic heat-resisting pigment and glass frit is sintered on the glass substrate layer thereby forming the coloured ceramic band layer 6.

The inorganic heat-resisting pigment is mixed to the color ceramic to give a desired color. The grain diameter of the inorganic heat-resisting pigment may be e.g. 0.1 μm to 10 μm, preferably 0.2 μm to 5 μm, in median diameter (D50). As the inorganic heat-resisting pigment, usual ones can be used. As examples of black pigments, there can be mentioned copper-chromium complex oxide, iron-manganese complex oxide, cobalt-iron-manganese complex oxide, copper-chromium-manganese complex oxide, magnetite and the like.

As examples of blue pigment, there can be mentioned cobalt blue, chromium green, cobalt-zinc-nickel-titanium complex oxide, cobalt-aluminum-chromium complex oxide and the like.

In addition to the above-mentioned, there can be used white pigment (e.g. titanium white, zinc oxide and the like), red pigment (e.g. rouge and the like), yellow pigment (e.g. titanium yellow, titanium-barium-nickel complex oxide, titanium-antimony-nickel complex oxide, titanium-antimony-chromium complex oxide and the like) and other pigments in line with the skilled person's knowledge.

The glass frit is fused through a heating process to form the coloured ceramic band layer 6. As the glass frit, usual ones can be used. As an example of the glass frit, there can be mentioned borosilicate glass, boron-zinc-silicate glass, bismuth-based glass and the like. A softening temperature of the glass frit may be a lower temperature, for example 300-600° C., preferably 350-580° C., than a bending and forming temperature of the glass substrate 2. The grain diameter of the glass frit may be 0.1 μm to 10 μm, preferably 0.2 μm to 5 μm, further preferably 1 μm to 4 μm (determined as D50). In the coloured ceramic band 6, the content of the glass material made of the glass frit may be 60 mass % to 80 mass %.

The coloured ceramic band layer 6 can be also obtained through other methods besides the above-mentioned process. As an example of such other processes, there can be mentioned a digital printing process.

The electrically conductive layer 3, preferably sintered on the glass substrate layer 2 and/or on the coloured ceramic band layer 6, has a pair of busbars 31 and plural conductive wires 32 connected to the busbars 31. The electrically conductive layer 3 preferably comprises silver metal (silver or silver alloy) and a glass frit which may be selected form those exemplified above. The thickness of the electrically conductive layer 3 may be e.g. 3 μm to 20 μm, preferably 5 μm to 15 μm, more preferably 12 μm to 17 μm.

The electrically conductive layer 3 can be obtained through the following process. That is, a silver paste comprising the silver metal, the glass frit and an organic solvent is applied on the glass substrate layer 2, or on the coated and dried ceramic color layer, by screen printing method or the like, and then is heated, volatilizing the organic solvent. Subsequently, the composition comprising the silver metal and the glass frit is sintered on the glass substrate layer 2 or coloured ceramic band 6 thereby forming the electrically conductive layer 3. As is well-known, the electrically conductive layer 3 can be used as a printed hot-wire such as a defogger and defroster, or as an antenna.

The grain diameter of the silver metal may be e.g. 0.1 μm to 10 μm, preferably 0.2 μm to 7 μm (determined as D50). In the electrically conductive layer 3, the content of the silver metal may be e.g. 65 mass % to 99 mass %, preferably 75 mass % to 98 mass %.

The electrically conductive layer 3 can be also obtained through other methods besides the above-mentioned process. As an example of such other processes, there can be mentioned a digital printing process.

The lead-free solder layer 4 made of a soldered lead-free solder connects the electrically conductive layer 3 with the metal plate elements 5 of the electrical connector. The lead-free solder may comprise tin and silver. As an example of such lead-free solder, there can be mentioned Sn—Ag based solder, Sn—Ag—Cu based solder and the like. The content of Sn may be e.g. 95 mass % to 99 mass %, preferably 96 mass % to 98 mass %. The content of Ag may be e.g. 1 mass % to 5 mass %, preferably 2 mass % to 4 mass %. The content of Cu may be e.g. 0 mass % to 1.5 mass %, preferably 0.1 mass % to 1 mass %.

The thickness of the lead-free solder layer 4 is desirably between 0.1 mm and 0.3 mm. In the case that the thickness is more than 0.3 mm, a difference of thermal expansion behaviour between the glass substrate 2 and the solder layer 4 may cause mechanical stress at an interface of the glass substrate layer 2 or the electrically conductive layer 3 during the soldering process, or while using the window glass 1 fitted in a vehicle. The mechanical stress may enhance a risk of permanent tensile stress in the glass substrate layer 2, resulting in crack generation in the glass substrate layer 2. On the other hand, in the case that the thickness is less than 0.1 mm, it may enhance a risk of a generation of hot spots at the solder layer during the soldering process. The generation of hot spots may result in the residual stress in the glass substrate 2, which causes cracking in the glass substrate 2.

Considering all the factors, the thickness of the lead-free solder layer 4 may be preferably between 0.15 mm and 0.25 mm.

The metal plate element 5 on the solder layer 4 is to be directly connected to an electric wiring or to be connected the electric wiring via metal bridge 51. The thickness of the metal plate element 5 on the solder layer 4 can influence the mechanical stress between the glass substrate 1 and the metal plate element 5. WO2007/110610 suggests that the thickness of the metal plate should be as thin as possible to reduce the mechanical stress. In this invention, however, the metal plate element 5 should be 0.5 mm to 0.7 mm thick.

In the case that the thickness is more than 0.7 mm, the mechanical stress can be too big to compensate, resulting in low yield of window glass 1 due to the occurrence of cracks in some window glasses 1. On the other hand, in the case that the thickness is less than 0.5 mm, hot spots easily generate in the connector under soldering process with electric resistance heating of the connector, causing residual stress in the glass substrate layer 2. The residual stress turns into cracks in the glass substrate layer 2.

Further, such a metal plate element 5 (i.e. less than 0.5 mm thick) needs to be very carefully handled to preserve flatness of the surface facing the lead-free solder layer 4 of the terminal, and this difficulty leads to low productivity of the window glass 1. A metal plate element 5 with a less flat surface can cause an inhomogeneous lead-free solder layer 4. The inhomogeneous lead-free solder layer 4 is liable to cause mechanical stress at the glass substrate layer side.

Considering above mentioned factors, the thickness of the metal plate element 5 on the solder layer 4 may be preferably 0.52 mm to 0.65 mm, more preferably 0.54 mm to 0.6 mm. The surface of the metal plate element 5 facing the solder layer 4 may desirably be flat, such as in particular having no protrusions or indentations, and/or not being bent or angled.

A big difference in thermal expansion coefficient between the metal plate element 5 and the glass substrate layer 2 may affect the mechanical stress between the window glass and the electrical connector. From that point of view, the metal plate element 5 preferably has similar thermal expansion coefficient to the glass substrate layer 2.

As an example of such metal plate element 5, there can be mentioned an iron alloy such as ferroaluminum, ferroboron (preferably 12 mass % to 20 mass % of boron, at most 3 mass % of silicon, at most 2 mass % of aluminium, at most 1 mass % of carbon), ferrocerium, ferrochromium, ferromagnesium, ferromanganese, ferromolybdenum, ferroniobium, ferronickel (Invar, Kovar, and the like) and the like. Among them, ferronickel alloy such as Invar (iron-nickel alloy) and Kovar (iron-nickel-cobalt alloy) is preferable.

A thermal expansion coefficient of Invar 48 containing 48 mass % of nickel is roughly $9 \times 10^{-6}$/degree C., which value is very close to one of a soda-lime silicate glass defined by ISO16293-1. Therefore, Invar 48 is the most preferable as a material of metal plate element 5.

The electrical connector comprises at least one metal plate element 5, and may comprise two metal plate elements 5 and a metal bridge 51 connecting the two metal plate elements 5 as shown in FIG. 1. The metal plate element 5 that is soldered to the conductive layer and the metal bridge 51 are preferably made from one metal material, preferably formed through processing one flat plate metal piece. Further, the metal plate element 5 may be a part of a crimped-wire antenna. In such case, it goes without saying that metal plate element 5 plays a role as an electrical connector.

The metal plate element 5 may be coated with at least one metal selected from a group consisting of Ni, Cu and Ag. Such coated metal plate element can improve wettability between the metal plate element 5 and melted lead-free solder. Further, the metal plate element 5 may be coated with a first Ni layer of 2 μm-5 μm thickness on the metal plate element 5, an intermediate Cu layer of 2 μm-5 μm thickness on the first Ni layer, and an external Ag layer of 5 μm-8 μm thickness on the Cu layer. The external Ag layer can promote the wettability and adhesion of the solder to the metal plate element. The intermediate Cu layer can protect a galvanic corrosion resulting from difference of ionization tendency between the Ag layer and "the first Ni layer or the metal plate element" and improve the electrical conductivity of Iron-based metal plate element 5. The first Ni layer may play a role as a primer to coating of the intermediate Cu layer. Not only the metal plate element 5 but also metal bridge 51 may be coated with same coating material(s) of the metal plate element 5.

A producing method of the window glass 1 may comprise:
 a step of preparing the glass substrate layer 2 having the electrically conductive layer 3 over the glass substrate 2 and optional coloured ceramic band layer 6 between the glass substrate layer 2 and the conductive layer 3;
 a step of preparing the electrical connector comprising at least one metal plate element 5 whose surface is welded by lead-free solder;
 a step of placing the lead-free solder on the conductive layer 3, and a step of energizing to heat the electrical connector to melt the lead-free solder—this step corresponds to a soldering process with electric resistance heating.

EXPERIMENTAL

Example 1

A base test specimen was prepared. The specimen comprises a thermally tempered glass substrate layer 2 of 3 mm thickness and made of a soda-lime silicate glass defined by ISO16293-1, and an electrically conductive layer 3 comprising a busbar 31 fired from silver paste on the glass substrate layer 2. An electrical connector was also prepared, comprising two rectangular metal plate elements 5 (each having 6×4 mm$^2$ area), on each of which one side is welded to 45 mg to 50 mg of lead-free solder made of Sn (96.5 mass %)-Ag (3.0 mass %)-Cu (0.5 mass %), and with a metal bridge 51 connecting the two metal plate elements 5. The electrical connector was processed from a flat plate metal of 0.55 mm thickness made of Invar 48 coated with a first Ni layer on the metal, an intermediate Cu layer on the first Ni layer, and an external Ag layer on the intermediate Cu layer.

The lead-free solder on the electrical connector was placed on the busbar 31 of the base test specimen, and heated by energizing between the two metal plate elements 5. By this step the lead-free solder was melted, and the electrical connector and the busbar 31 were soldered by the lead-free solder. In this experiment the soldered specimen was taken as the vehicle window glass 1.

The following heat cycle tests were conducted for ten samples made in accordance with Example 1.

(1) 20 times repeat of alternate cycling from −40° C. to +80° C. over 12 hours.

(2) Holding each sample at −40° C. for 4 hours and at +80° C. for 4 hours, with 80% controlled humidity at positive temperatures and uncontrolled humidity at negative temperatures.

No crack in the glass substrate 2 was observed for any of the ten samples.

Comparative Example 1

The procedure of Example 1 was repeated with the exception that the electrical connector was processed from a flat plate metal of 0.4 mm thickness. Cracking was observed for 3 out of the 10 samples in this comparative example.

Comparative Example 2

The procedure of Example 1 was repeated with the exception that the electrical connector was processed from a flat plate metal of 0.8 mm thickness. Cracking was observed for 3 out of the 10 samples in this comparative example.

The invention claimed is:

1. A vehicle window glass, comprising:
a glass substrate layer, wherein the glass substrate layer is a soda-lime silicate glass defined by International Organization for Standardization (ISO) 16293-1;
an electrically conductive layer forming a conductive pattern over the glass substrate layer;
a lead-free solder layer on the electrically conductive layer, wherein the lead-free solder layer is made of a tin-based metal alloy comprising silver; and
a metal plate element on the lead-free solder layer, wherein the metal plate element comprises iron alloy and has a thickness from 0.54 mm to 0.6 mm, and the iron alloy is Invar 48.

2. The vehicle window glass according to claim 1, further comprising a colored ceramic band layer between the glass substrate layer and the electrically conductive layer.

3. The vehicle window glass according to claim 1, wherein a thickness of the lead-free solder layer is between 0.1 mm and 0.3 mm.

4. The vehicle window glass according to claim 1, wherein the metal plate element is comprised in an electrical connector for connecting the electrically conductive layer to external electric wiring.

5. The vehicle window glass according to claim 4, wherein the electrical connector comprises first and second metal plate elements connected by a metal bridge portion.

6. The vehicle window glass according to claim 5, wherein the first and second metal plate elements and the metal bridge portion are formed integrally from a single piece of metal plate material.

7. The vehicle window glass according to claim 1, wherein a surface of the metal plate element facing the lead-free solder layer is flat.

8. The vehicle window glass according to claim 1, wherein a surface of the metal plate element facing the lead-free solder layer has no protrusions or indentations and is not bent or angled.

9. The vehicle window glass according to claim 1, wherein the metal plate element is coated with one or more metals selected from Ni, Cu and Ag.

10. The vehicle window glass according to claim 1, wherein the metal plate element is coated with a Ni layer of 2 μm-5 μm thickness on the metal plate element, a Cu layer of 2 μm-5 μm thickness on the Ni layer, and an Ag layer of 5 μm-8 μm thickness on the Cu layer.

11. A method of making a vehicle window glass, the method comprising:
providing a glass substrate layer, wherein the glass substrate layer is a soda-lime silicate glass defined by International Organization for Standardization (ISO) 16293-1;
providing an electrically conductive layer to form a conductive pattern over the glass substrate layer;
providing a lead-free solder layer on the electrically conductive layer, wherein the lead-free solder layer is made of a tin-based metal alloy comprising silver; and
providing a metal plate element on the lead-free solder layer, wherein the metal plate element comprises iron alloy and has a thickness from 0.54 mm to 0.6 mm, wherein the iron alloy is Invar 48.

12. The method according to claim 11, further comprising:
preparing the glass substrate layer having the electrically conductive layer on the glass substrate layer;
preparing an electrical connector comprising the metal plate element with a surface to be soldered;
placing lead-free solder on the electrically conductive layer; and
energizing to heat the electrical connector by electric resistance heating and thereby melt the lead-free solder between the electrically conductive layer and the surface of the metal plate element.

13. The method according to claim 11, further comprising providing a colored ceramic band layer between the glass substrate layer and the electrically conductive layer.

14. The method according to claim 11, wherein a thickness of the lead-free solder layer is between 0.1 mm and 0.3 mm.

15. The method according to claim 12, wherein the metal plate element is comprised in the electrical connector for connecting the electrically conductive layer to external electric wiring.

16. The method according to claim 15, wherein the electrical connector comprises first and second metal plate elements connected by a metal bridge portion.

17. The method according to claim 16, wherein the first and second metal plate elements and the metal bridge portion are formed integrally from a single piece of metal plate material.

18. The method according to claim 11, wherein a surface of the metal plate element facing the lead-free solder layer is flat.

19. The method according to claim 11, wherein a surface of the metal plate element facing the lead-free solder layer has no protrusions or indentations and is not bent or angled.

20. The method according to claim 11, wherein the metal plate element is coated with one or more metals selected from Ni, Cu and Ag.

21. The method according to claim 11, wherein the metal plate element is coated with a Ni layer of 2 μm-5 μm thickness on the metal plate element, a Cu layer of 2 μm-5 μm thickness on the Ni layer, and an Ag layer of 5 μm-8 μm thickness on the Cu layer.

\* \* \* \* \*